*(12)* United States Patent
Miura

*(10)* Patent No.: US 9,137,353 B2
*(45)* Date of Patent: Sep. 15, 2015

(54) ELECTRONIC DEVICE AND DISPLAY METHOD EMPLOYED IN ELECTRONIC DEVICE

(75) Inventor: Hiroaki Miura, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 13/121,219

(22) PCT Filed: Sep. 29, 2009

(86) PCT No.: PCT/JP2009/066991
§ 371 (c)(1),
(2), (4) Date: Mar. 28, 2011

(87) PCT Pub. No.: WO2010/035878
PCT Pub. Date: Apr. 1, 2010

(65) Prior Publication Data
US 2011/0175842 A1    Jul. 21, 2011

(30) Foreign Application Priority Data

Sep. 29, 2008  (JP) ................................ 2008-251713

(51) Int. Cl.
*G06F 3/041*    (2006.01)
*H04M 1/725*    (2006.01)
(Continued)

(52) U.S. Cl.
CPC ........... *H04M 1/72583* (2013.01); *G06F 3/044* (2013.01); *G06F 3/04886* (2013.01)

(58) Field of Classification Search
CPC . G06F 3/044; G06F 3/04886; H04M 1/72583
USPC ........ 345/156, 157, 167, 168, 173–183, 204; 178/18.01–18.09, 19.01–19.04, 20.01
See application file for complete search history.

(56) References Cited

U.S. PATENT DOCUMENTS

2001/0026288 A1* 10/2001 Shima ............................ 345/764
2004/0207606 A1* 10/2004 Atwood et al. ............... 345/173
(Continued)

FOREIGN PATENT DOCUMENTS

| CN | 101202866 A | 6/2008 |
|---|---|---|
| JP | 2005-050265 | 2/2005 |
| JP | 2007-328421 | 12/2007 |
| JP | 2008-123407 | 5/2008 |
| JP | 2008-181169 | 8/2008 |
| JP | 2008-226048 | 9/2008 |

OTHER PUBLICATIONS

International Search Report for PCT/JP2009/066991, dated Nov. 2, 2009.

(Continued)

*Primary Examiner* — Kumar Patel
*Assistant Examiner* — Insa Sadio
(74) *Attorney, Agent, or Firm* — Lowe Hauptman & Ham, LLP (57) ABSTRACT

Provided are an electronic device wherein operability is improved by changing display contents as needed corresponding to a touch state with a display area, and a display method employed in the electronic device The electronic device is provided with: a display section (21) which indicates selection items; a detecting section (31) which detects a touch with a display area of the display section (21); and a control section (32) which controls to switch the display state of the display section (21) corresponding to the touch state with the display area to a first display state wherein a first display item group having a plurality of first hierarchical items relating to the selected item or to a second display state wherein a second display item group which has a plurality of second hierarchical items relating to the selected item and the number of items larger than that of the first display item group, at the time when a touch with the display area that corresponds to the selected item is detected by the detecting section (31) in the state where the selection items are displayed on the display section (21).

10 Claims, 10 Drawing Sheets

(51) Int. Cl.
*G06F 3/044* (2006.01)
*G06F 3/0488* (2013.01)

(56) References Cited

U.S. PATENT DOCUMENTS

| 2004/0217945 | A1* | 11/2004 | Miyamoto et al. | 345/173 |
| 2006/0038789 | A1* | 2/2006 | Ban et al. | 345/169 |
| 2006/0044283 | A1* | 3/2006 | Eri et al. | 345/173 |
| 2008/0136790 | A1 | 6/2008 | Hio | |
| 2008/0141145 | A1* | 6/2008 | Klausmeier | 715/751 |

OTHER PUBLICATIONS

Notice of Reasons for Rejection issued to JP Application No. 2010-530903, mailed Aug. 7, 2012.
Office Action issued to Korean Application No. 10-2011-7009594, mailed Sep. 22, 2012.
Office Action issued to CN Application No. 200980137266.8, mailed Aug. 31, 2012.

* cited by examiner

ELECTRONIC DEVICE AND DISPLAY METHOD EMPLOYED IN ELECTRONIC DEVICE

CROSS-REFERENCE TO RELATED APPLICATIONS

This application is the National Stage of International Application No. PCT/JP2009/066991, which designates the U.S., filed Sep. 29, 2009 which claims the benefit of JP 2008-251713, filed Sep. 29, 2008, the contents of which are incorporated by reference herein.

TECHNICAL FIELD

The present invention relates to an electronic device having a touch sensor, and a display method employed in the electronic device.

BACKGROUND ART

In recent years, an increasing number of mobile terminal devices have been provided with a touch sensor capable of performing various operations (for example, activation of a music player, etc.) by detecting touch by a pen or a finger. In such a mobile terminal device, various input keys are displayed on a display such as an LCD (Liquid Crystal Display), a transparent touch panel is superimposed on the display, and the various input keys transmitted through this touch panel to be displayed are operated (touched) by a finger or a pen, thereby performing input operations.

Here, since a finger tip is larger than a pen tip in terms of a touch dimensions, in a case in which the interval between adjacent key touch areas is narrow, a plurality of adjacent keys may be touched at the same time, which may potentially cause malfunction. Therefore, in order to solve such a problem, a method has been proposed in which an interval between adjacent key touch areas is controlled to be widened when touching by a finger, thereby avoiding a plurality of keys from being touched at the same time, and preventing malfunction (for example, see Patent Document 1).

Patent Document 1: Japanese Unexamined Patent Application, Publication No. 2005-050265

DISCLOSURE OF THE INVENTION

Problems to be Solved by the Invention

Incidentally, in the aforementioned method, the interval between adjacent key touch areas is not widened when touching by a pen, whereas the interval between adjacent key touch areas is widened when touching by a finger, and such a manner aims to provide means that prevents malfunction and excels in operability; however, display contents are not changed, but rather fixed between a case of touching by a finger and a case of touching by a pen.

An object of the present invention is to provide an electronic device and a display method employed in the electronic device, capable of improving the operability by appropriately changing display contents in accordance with a touch state on a display area.

Means for Solving the Problems

In order to solve the aforementioned problems, an electronic device according to the present invention is characterized by including: a display unit that displays a selection item; a detecting unit that detects a touch on the display area of the display unit; and a control unit that, in a state where the selection item is displayed on the display unit, in a case of the detecting unit detecting a touch on the display area corresponding to the selection item, causes a display state of the display unit to transition, in accordance with a touch state on the display area, to a first display state of displaying a first display item group having a plurality of first hierarchical items associated with the selection item, or a second display state of displaying a second display item group having a plurality of second hierarchical items associated with the selection item, wherein a number of items in the second display item group is greater than a number of items in the first display item group.

Moreover, in the electronic device, it is preferable for the control unit to cause the display state of the display unit to transition in accordance with a touch dimensions with the display area.

In addition, in the electronic device, it is preferable for the detecting unit to have a plurality of capacitive sensors, and detect a touch on the display area by way of a change in electrostatic capacity in the capacitive sensors, and it is preferable for the control unit to determine the touch dimensions in accordance with a number of the capacitive sensors for which electrostatic capacity has changed.

Furthermore, in the electronic device, it is preferable for the control unit to cause the display state to transition to the first display state in a case of determining that the touch dimensions is greater than a predetermined area, and it is preferable for the control unit to cause the display state to transition to the second display state in a case of determining that the touch dimensions is not greater than the predetermined area.

Moreover, in the electronic device, it is preferable for the plurality of second hierarchical items in the second display item group to include the plurality of first hierarchical items in the first display item group, and it is preferable for the control unit to perform control to display the second hierarchical items including the first hierarchical items when displaying the second display item group.

In addition, in the electronic device, it is preferable for the plurality of second hierarchical items in the second display item group to be hierarchical items in relation to the plurality of first hierarchical items in the first display item group.

Furthermore, in the electronic device, it is preferable for the control unit to perform control to display the first hierarchical items together with the second hierarchical items when displaying the second display item group.

Moreover, in the electronic device, it is preferable for the detecting unit to be able to detect a touch on the display area of the selection item as well as a touch on a display area different from the display area of the selection item, and in a state where the selection item is displayed on the display unit, in a case in which the detecting unit detects a touch on the display area of the selection item, it is preferable for the control unit to cause the display state of the display unit to transition to the first display state or the second display state, in accordance with touch state of the display area of the selection item and the display area different from the display area of the selection item.

In addition, in the electronic device, it is preferable for the detecting unit to be able to detect a touch on a display area different from the display area of the selection item, and in a state where the selection item is displayed on the display unit, in a case in which the detecting unit detects a touch on the display area different from the display area of the selection item, it is preferable for the control unit to cause the display state of the display unit to transition, in accordance with a touch state on the display area different from the display area of the selection item, to a state of maintaining display of the selection item, or a state of displaying the first display item group having the plurality of first hierarchical items associated with the selection item.

Furthermore, in the electronic device, it is preferable for the detecting unit to be able to detect a touch on a display area of an initial screen, and in a state where the initial screen is displayed on the display unit, in a case of the detecting unit detecting a touch on the display area of the initial screen, it is preferable for the control unit to cause the display state of the display unit to transition, in accordance with a touch state on the display area of the initial screen, to a state of displaying the selection item, or a state of displaying the first display item group having the plurality of first hierarchical items associated with the selection item.

Moreover, it is preferable for the electronic device to include a body and a removable member that can be attached to and detached from the body, the detecting unit detecting a touch on a display area of the display unit when the removable member touches the display area of the display unit, and in a state where the selection item is displayed on the display unit, in a case in which the detecting unit detects a touch on the display area of the selection item, it is preferable for the display state of the display unit to transition to the first display state or the second display state, in accordance with the touch state that is determined based on an attachment/detachment state of the removable member in relation to the body.

In addition, an electronic device according to the present invention is characterized by including: a display unit that displays hierarchical items, and has a display area in which a touch can be detected; a detecting unit that detects a touch on the display area of the display unit; and a control unit that, in a state where a plurality of high-order hierarchical items are displayed on the display unit, changes a number of a plurality of low-order hierarchical items associated with the high-order hierarchical items displayed on the display unit, in accordance with a touch state on the display area, in a case in which the detecting unit detects a touch on a display area corresponding to the high-order hierarchical item.

Furthermore, a display method in an electronic device according to the present invention is characterized by including the steps of: displaying a selection item on a display unit; detecting a touch on a display area of the display unit; and causing a display state of the display unit to transition to, in accordance with a touch state on the display area, a first display state of displaying a first display item group having a plurality of first hierarchical items associated with the selection item, or a second display state of displaying a second display item group having a plurality of second hierarchical items associated with the selection item, wherein a number of items in the second display item group is greater than a number of items in the first display item group.

Effects of the Invention

According to the present invention, the operability can be improved.

PREFERRED MODE FOR CARRYING OUT THE INVENTION

First Embodiment

Figure 1:
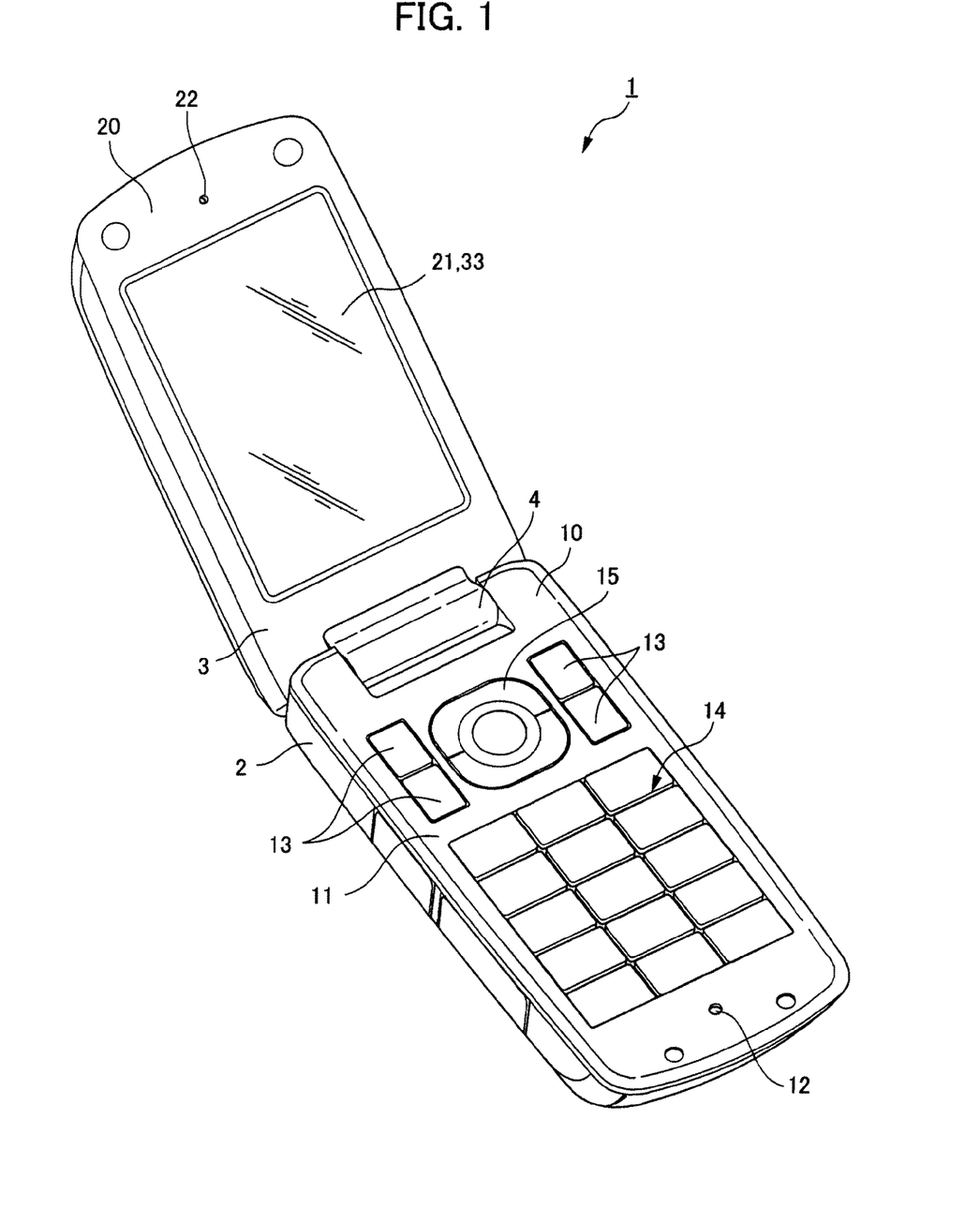
FIG. 1 is a perspective view showing an appearance of a cellular telephone device according to an embodiment of the present invention.

A description is provided hereinafter regarding a first embodiment of the present invention. FIG. 1 is a perspective view showing an appearance of a cellular telephone device 1 (electronic device) according to the present embodiment. It should be noted that, although FIG. 1 shows a so-called folder-type cellular telephone device, the cellular telephone device according to the present invention is not limited thereto. For example, the type of the cellular telephone device may be a slider type in which one of the bodies slides to one direction in a state in which the bodies are mutually superimposed; a rotating (turning) type in which one of the bodies is rotated around an axis line along the direction of superimposing the bodies; and a type (straight type or flip type) in which an operation unit and a display unit are disposed in one body without having a connecting portion.

The cellular telephone device 1 is configured to include an operation unit side body 2 and a display unit side body 3. The operation unit side body 2 is configured to include, on a front face portion 10 thereof, a key input portion 11 and a microphone 12 to which sound produced by a user of the cellular telephone device 1 during a phone call is input. The key input portion 11 is configured with: function setting operation buttons 13 for operating various functions such as for various setting functions, a telephone number directory function and a mail function; input operation buttons 14 for inputting the digits of a telephone number and characters for mail, etc.; and a selection operation button 15 for performing selection of various operations, scrolling, etc.

Moreover, the display unit side body 3 is configured to include, on a front face portion 20, a display unit 21 for displaying a variety of information, and a receiver 22 for outputting sound of the other party of the conversation. Furthermore, a display area 33, which can transmit an image displayed on the display unit 21 and can accept an input by a depression operation, is disposed to be superimposed on the front face 20 of the display unit 21.

In addition, an upper end portion of the operation unit side body 2 and a lower end portion of the display unit side body 3 are connected via a hinge mechanism 4. Moreover, the cellular telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

The cellular telephone device 1 with such a configuration has a touch panel, and has a function to improve the operability by appropriately changing the contents displayed on the display unit 21 in accordance with the touch state on the touch panel (for example, a touch input by a pen or a finger).

Figure 2:
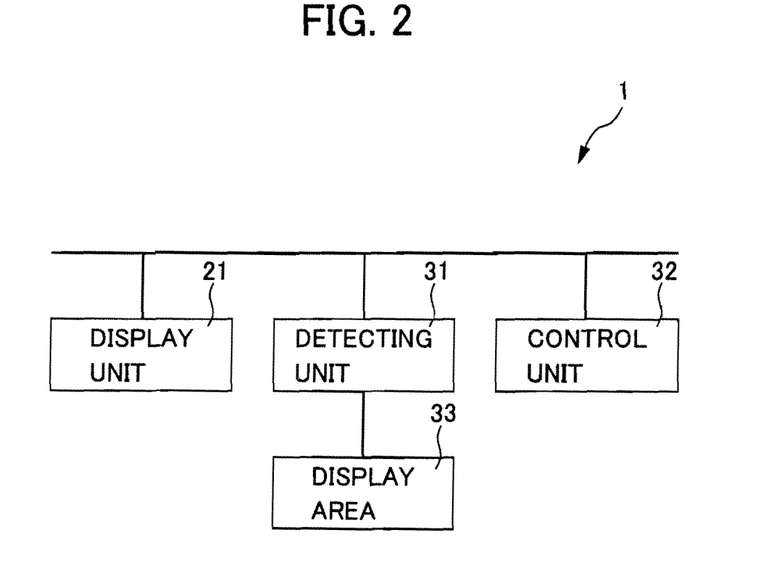
FIG. 2 is a block diagram showing functions of the cellular telephone device according to an embodiment of the present invention.

Here, a configuration for exhibiting the function is described in detail with reference to FIG. 2. As shown in FIG. 2, the cellular telephone device 1 includes the display unit 21, a detecting unit 31 and a control unit 32. The display unit 21 displays a plurality of selection items. The detecting unit 31 detects a touch on the display area 33 corresponding to a selection item displayed on the display unit 21. In a state where a selection item is displayed on the display unit 21, when the detecting unit 31 detects a touch corresponding to the selection item on the display area 33, depending on the touch state on the display area 33, the control unit 32 causes a display state of the display unit 21 to transition to a first display state of displaying a first display item group having a plurality of first hierarchical items associated with the selection item, or a second display state of displaying a second display item group having a plurality of second hierarchical items associated with the selection item, in which the number of items in the second display item group is greater than the number of items in the first display item group.

In one embodiment, the plurality of second hierarchical items in the second display item group includes the plurality of first hierarchical items in the first display item group. In other words, the second hierarchical items constitute a part of the first hierarchical items. In this case, when the second display item group is displayed, the control unit 32 performs control to display the plurality of second hierarchical items including the first hierarchical items.

Moreover, in an alternative embodiment, the plurality of second hierarchical items in the second display item group are hierarchical items in relation to the plurality of first hierarchical items in the first display item group. In other words, the second hierarchical items are low-order hierarchical items in relation to the first hierarchical items.

In addition, when the second display item group is displayed, the control unit 32 performs control to display the first hierarchical items together with the plurality of second hierarchical items. In other words, in a state where a plurality of selection items are displayed (see FIG. 6 (a)), and for example, when a "telephone" item is touched by a finger, the control unit 32 performs control such that each item among "outgoing call history", "incoming call history" and "direct input" is displayed as the first hierarchical items on the display unit 21 (see FIG. 6 (b)). On the other hand, in a state where a plurality of selection items are displayed (see FIG. 6 (a)), and for example, when the "telephone" item is touched by a pen, the control unit 32 performs control such that the "outgoing call history" and the "incoming call history" are displayed as first hierarchical items on the display unit 21, and numerical strings such as "090XXX", "090YYY" and "090ZZZ" are displayed as the second hierarchical items on the display unit 21.

Here, a description is provided regarding how the detecting unit 31 and the control unit 32 behave in a coordinated manner in accordance with a touch on the display area 33. The detecting unit 31 is a sensor that detects a position touched (depressed) by a finger tip, a pen tip or the like of the user. The detecting unit 31 outputs a result of detecting a touch on the display area 33 to the control unit 32. The control unit 32 performs a variety of processing as a variety of operational inputs in accordance with the detection result. It should be noted that a sensor, which employs an existing method such as a capacitive sensing method or a resistive film method, can be utilized in the detecting unit 31.

With such a configuration, in the cellular telephone device 1, a display manner can be appropriately changed in accordance with the touch state on the display area 33, and thus the operability can be improved.

Furthermore, when the detecting unit 31 detects a touch on the display area 33, the detecting unit 31 also detects a touch dimensions thereof. When the control unit 32 calculates a touch dimensions detected by the detecting unit 31, in a case in which the control unit 32 determines that the touch dimensions is at least a predetermined area based on the result of the calculation (for example, in a case of touching by a finger), it is preferable that the control unit 32 performs control such that the plurality of first hierarchical items associated with the selection item are displayed; and in a case in which the control unit 32 determines that the touch dimensions is not at least the predetermined area based on the result of the calculation (for example, in a case of touching by a pen tip), it is preferable that the control unit 32 performs control such that the plurality of second hierarchical items associated with the selection item are displayed.

Figure 3:
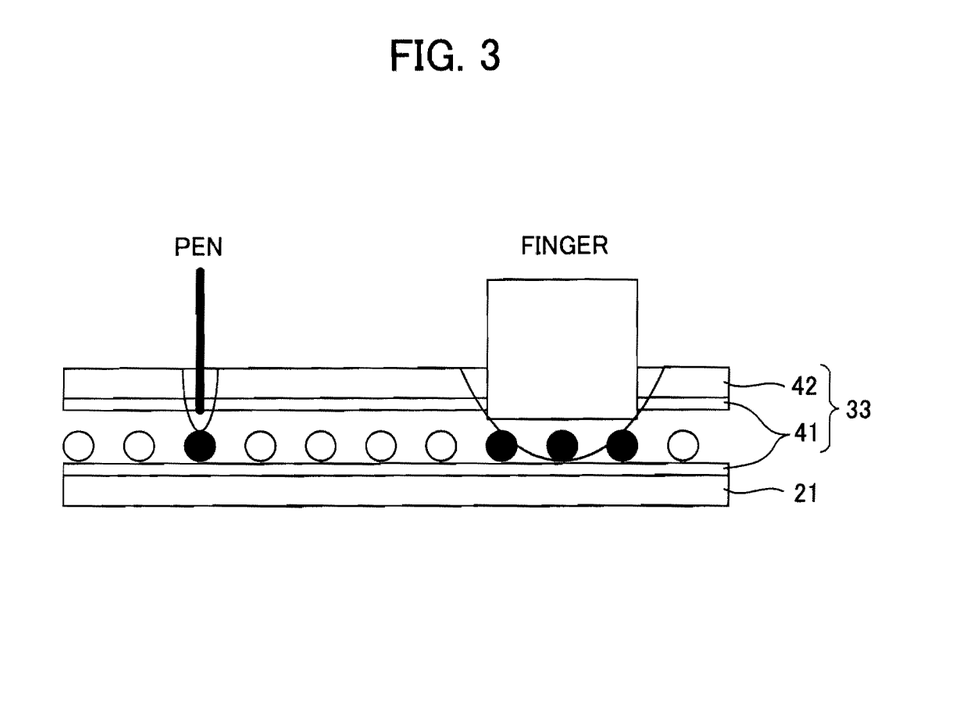
FIG. 3 is a diagram illustrating a method of calculating a touch dimensions by way of a control unit.

Here, a method of calculating a touch dimensions by way of the control unit 32 is described. As shown in FIG. 3, the display area 33 is disposed on a top surface of the display unit 21, and a plurality of detecting elements are disposed at constant intervals in a matrix inside a transparent electrode 41. The detecting unit 31 planarly detects the number of detecting elements that reacted when the panel surface 42 was touched, and outputs the detection result to the control unit 32. Based on the detection result, the control unit 32 calculates an area that is covered by the touch. For example, in a case in which the area is less than 5 $mm^2$, the control unit 32 determines that the touch has been made by a pen tip; in a case in which the area is at least 5 $mm^2$ and less than 2 $cm^2$, the control unit 32 determines that the touch has been made by a (smaller) finger; and in a case in which the area is at least 2 $cm^2$, the control unit 32 determines that the touch has been made by a (larger) finger.

Moreover, the detecting unit 31 may detect the touch dimensions of a touching object whenever a touch occurs, and the control unit 32 may calculate the touch dimensions detected by the detecting unit 31; alternatively, once the detecting unit 31 detects the touch dimensions, the control unit 32 may thereafter determine that subsequent touches will have the touch dimensions.

It should be noted that the detecting elements may be, for example, capacitive sensors. In other words, the detecting unit 31 may be, for example, arranged along the display unit 21, and may be configured to arrange the plurality of capacitive sensors, of which electrostatic capacity is changed in accordance with a touch on the display area 33.

In this case, in a case in which the control unit 32 determines that the number of the capacitive sensors, of which the electrostatic capacity has been changed in accordance with the touch on the display area 33, is greater than a predetermined number, the control unit 32 performs control such that the plurality of first hierarchical items associated with the selection item are displayed; and in a case in which the control unit 32 determines that the number of the capacitive sensors, of which electrostatic capacity has been changed in accordance with the touch on the display area 33, is not greater than the predetermined number, the control unit 32 performs control such that the plurality of second hierarchical items associated with the selection item are displayed.

A specific example of such a determination by way of the control unit 32 may be as follows. In other words, in a case in which the plurality of capacitive sensors present, of which electrostatic capacity has been changed to greater than a predetermined degree in accordance with the touch on the display area 33, are in touch with one another, and the number of capacitive sensors is greater than a predetermined number, the control unit 32 determines that the touch has been made by a finger tip, etc. On the other hand, in a case in which the plurality of capacitive sensors present, of which electrostatic capacity has been changed to greater than the predetermined degree in accordance with the touch on the display area 33, are in touch with one another, and the number of capacitive sensors is not greater than the predetermined number, the control unit 32 determines that the touch has been made by a pen tip, etc.

With such a configuration, in the cellular telephone device 1, an optimal display manner can be provided in accordance with the touch dimensions, a display screen adapted to the user's use case can be provided, and the operability can be improved. It should be noted that, although the present embodiment is described as including a function to utilize a touch dimensions to determine whether the touch is made by a pen or a finger, it is not limited thereto.

Figure 4:
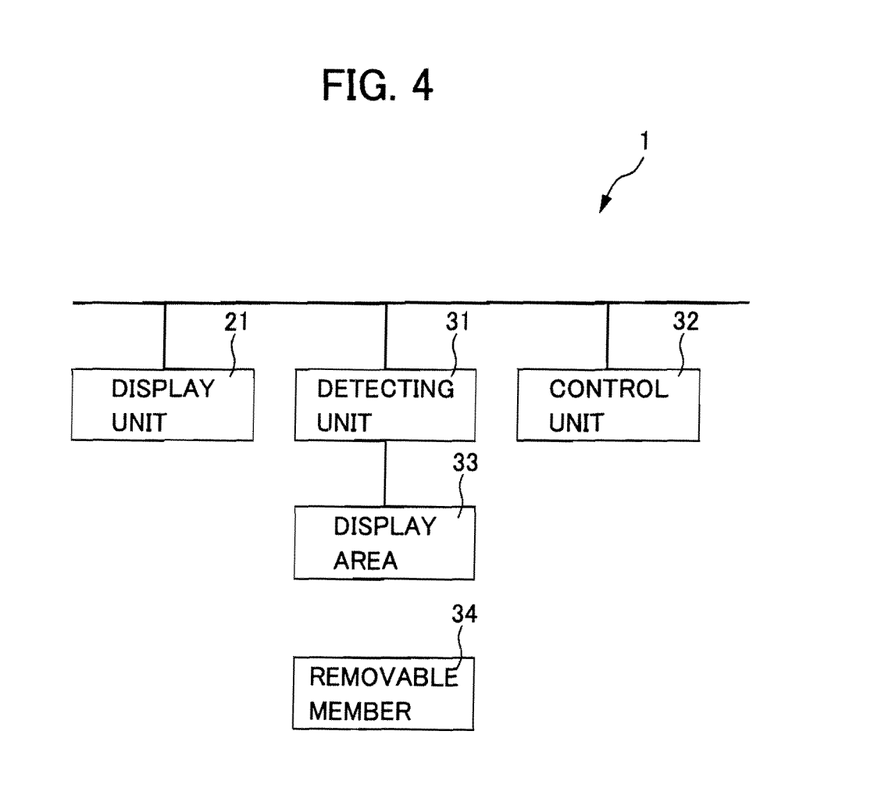
FIG. 4 is a block diagram showing functions of a cellular telephone device according to an alternative embodiment of the present invention.

In other words, the cellular telephone device 1 includes a body (the operation unit side body 2 or the display unit side body 3) and a removable member 34 (for example, a touching object such as a pen) that is attachable to and detachable from the body. When the removable member 34 touches the display area 33 of the display unit 21, the detecting unit 31 detects such a touch on the display area 33 of the display unit 21. In this case, in a state where a selection item is displayed on the display unit 21, when the detecting unit 31 detects a touch on the display area 33 of the selection item, the control unit 32 causes the display state of the display unit 21 to transition to the first display state or the second display state, in accordance with the touch state that is determined based on the attachment/detachment state of the removable member 34 in relation to the body.

Figure 5:
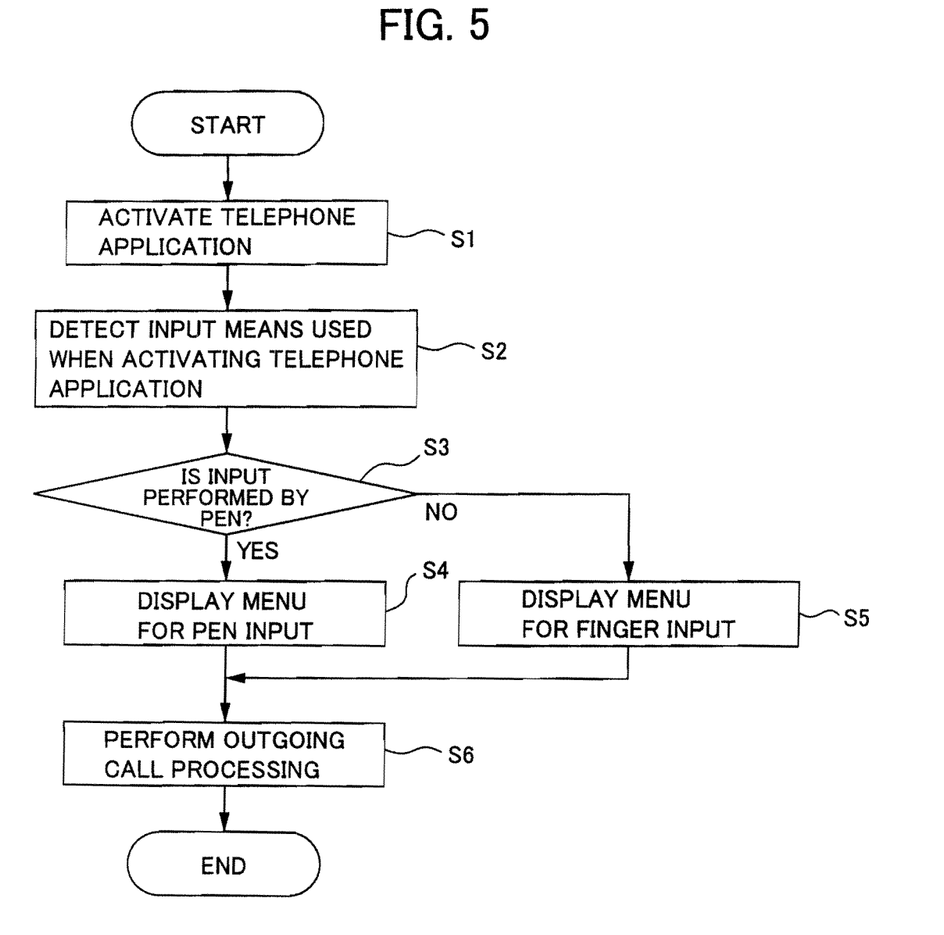
FIG. 5 is a flowchart illustrating behavior of the control unit in a case in which a telephone call is made from a standby screen with an input operation by a finger or a pen.

Next, with reference to the flowchart shown in FIG. 5, a description is provided for behavior of the control unit 32 in a case in which a telephone call is made from a standby screen (an initial screen that is displayed in a state of waiting for a telephone call) by way of input operations by a finger or a pen. It should be noted that the following description assumes a case of activating an application by way of operations by a finger or a pen, instead of key operations by way of the key input portion 11.

In Step S1, the control unit 32 activates a telephone application in response to an operation by the user.

In Step S2, the control unit 32 detects the input means used when activating the telephone application according to the processing of Step S1.

In Step S3, the control unit 32 determines whether an input has been made by a pen based on detection according to the processing of Step S2. In a case in which it is determined that the input has been made by a pen (YES), the processing advances to Step S4, and in a case in which it is determined that the input has been made not by a pen but by a finger (NO), the processing advances to Step S5.

In Step S4, the control unit 32 performs control such that a display menu for pen input is displayed on the display unit 21.

Moreover, in Step S5, the control unit 32 performs control such that a display menu for finger input is displayed on the display unit 21.

In Step S6, the control unit 32 performs outgoing call processing, on the condition that the user has selected (input) a predetermined telephone number from the display menu displayed on the display unit 21, and has performed an outgoing call operation.

Telephone Application

Figure 6:
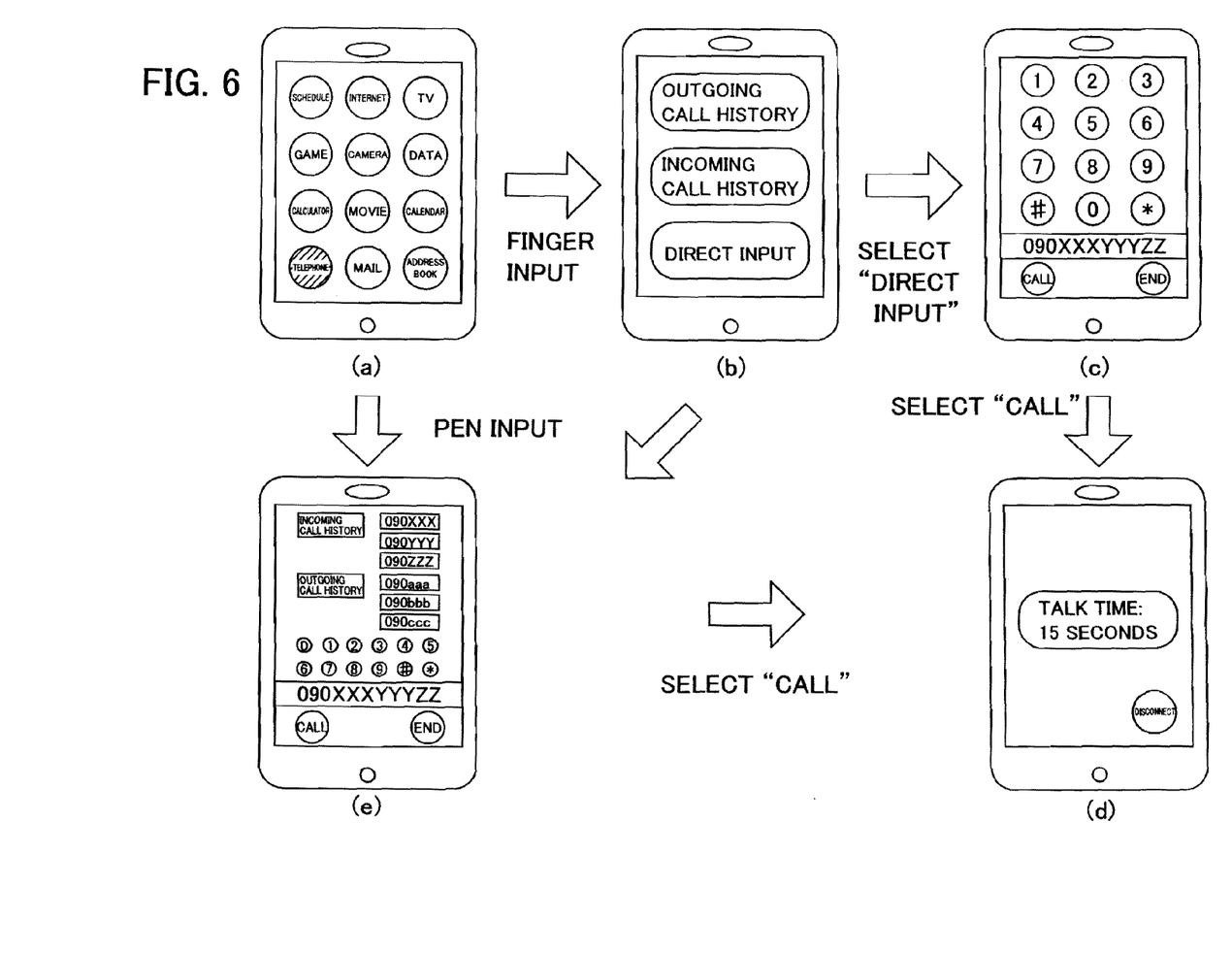
FIG. 6 is a schematic diagram showing how a display manner of a display unit changes depending on whether a touch input is made by a pen or a finger, when performing operations of a telephone application.

Next, a detailed description is provided on how a display manner of the display unit 21 changes in accordance with whether a touch input is made by a pen or a finger, when performing the operation of the telephone application. It should be noted that the following description assumes that, when an input is made by a finger, a number is directly input from the "direct input" to perform outgoing call processing, and when an input is made by a pen, a number is directly input to perform outgoing call processing. It should be noted that, in a case of utilizing the "outgoing call history", when an input is made by a finger, a number can be selected from the "outgoing call history" to perform outgoing call processing, and when an input is made by a pen, a number in the "outgoing call history" can be selected to perform outgoing call processing.

In a state where a plurality of selection items are displayed (FIG. 6 (a)), in a case in which a selection item of "telephone" is touched by a finger, the control unit 32 performs control such that a display menu for finger input is displayed on the display unit 21 (FIG. 6 (b)). Moreover, in a state where the display menu for finger input is displayed, in a case in which the "direct input" item is touched by a finger, the control unit 32 performs control such that a display screen for direct input is displayed on the display unit 21 (FIG. 6 (c)). In addition, in a case in which a predetermined telephone number "090XXXYYYZZ" is selected by a touch input by a finger, and a "call" item is touched by a finger, the control unit 32 performs outgoing call processing and transitions to a telephone call status display (FIG. 6 (d)).

On the other hand, in a state where a plurality of selection items are displayed (FIG. 6 (a)), in a case in which the selection item of "telephone" is touched by a pen, the control unit 32 performs control such that the display menu for pen input is displayed on the display unit 21 (FIG. 6 (e)). Furthermore, in a case in which the predetermined telephone number "090XXXYYYZZ" is input by a direct input by a pen, and the "call" item is touched by a pen, the control unit 32 performs outgoing call processing and transitions to a telephone call status display (FIG. 6 (d)).

In this way, with the cellular telephone device 1, in a case of touching by a finger in the operation of the telephone application, the screen transitions from FIG. 6 (a), FIG. 6 (b), FIG. 6 (c) and to the telephone call status display in FIG. 6 (d); and in a case of touching by a pen, the screen transitions from FIG. 6 (a), FIG. 6 (e) and to the telephone call status display in FIG. 6 (d); therefore, a display screen adapted to the user's use case can be provided in accordance with whether a pen or a finger is used as the operational input means, and thus the operability can be improved.

It should be noted that the control unit 32 may be configured such that, in a state where the display menu for finger input as shown in FIG. 6 (*b*) is displayed on the display unit 21, in a case of recognizing that a predetermined location on the display menu is touched by a pen, the control unit 32 performs control such that the display menu for pen input as shown in FIG. 6 (*e*) is displayed on the display unit 21.

Attachment File Selection Operation when Creating Mail Message

Figure 7:
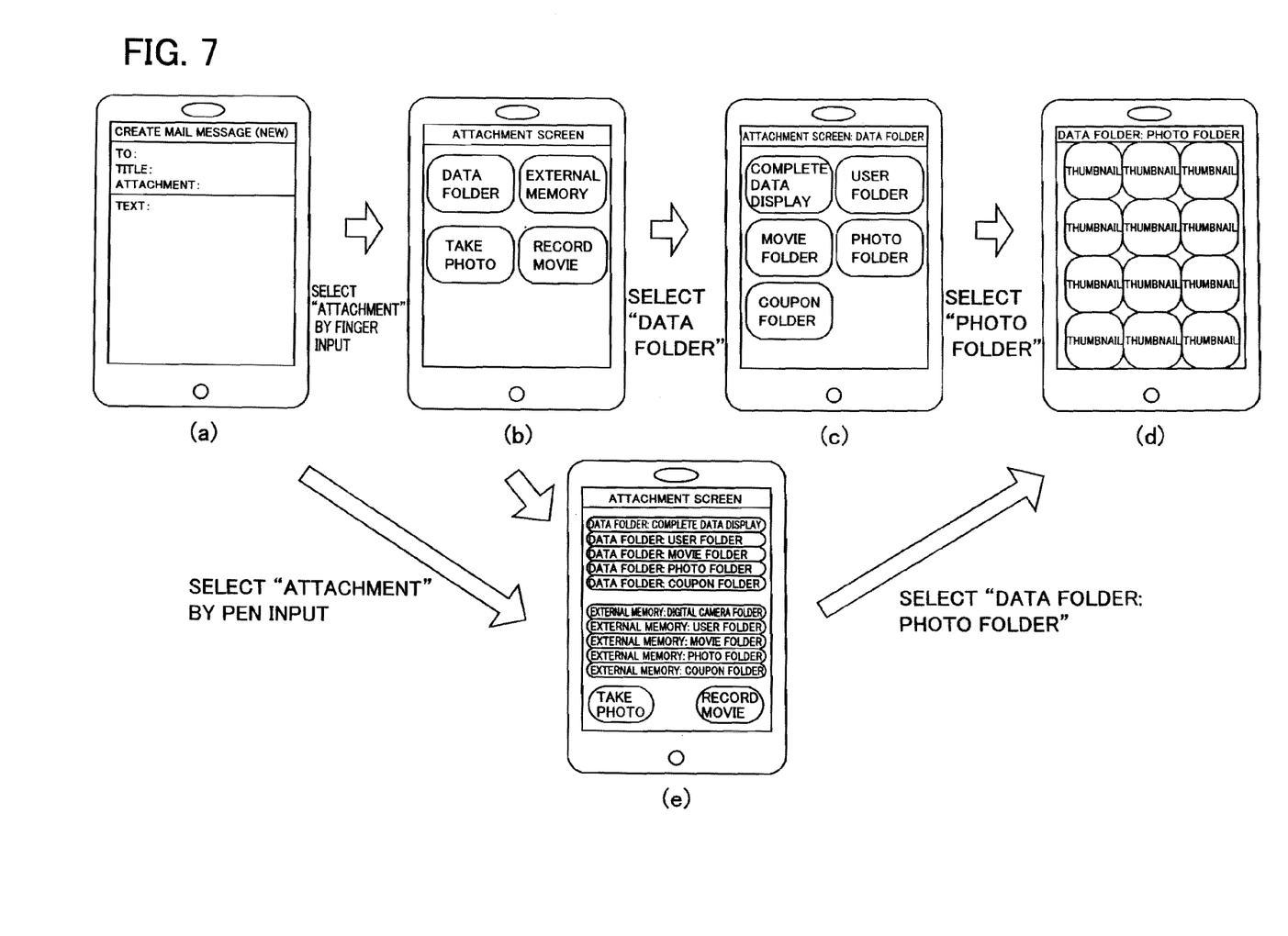
FIG. 7 is a schematic diagram showing how a display manner of the display unit changes depending on whether a touch input is made by a pen or a finger, when performing operations of selecting an attachment file when creating a mail message.

Next, a detailed description is provided on how the display manner of the display unit 21 changes in accordance with whether a touch input is made by a pen or a finger, when performing operations of selecting an attachment file when creating a mail message. It should be noted that the following description assumes that a mail application has been activated by a predetermined operation, and the screen has transitioned to a screen for creating a new outgoing mail message.

In a case in which an "attachment" item is touched by a finger on a screen for creating a new outgoing mail message (FIG. 7 (*a*)), the control unit 32 performs control such that a display menu for finger input is displayed on the display unit 21. Here, the control unit 32 performs control to display a "data folder" item and an "external memory" item for storing attachment data, and a "photo taking" item and a "movie taking" item for capturing attachment data by utilizing an imaging function (FIG. 7 (*b*)). In a case in which the "data folder" item is selected by a finger touch, the control unit 32 performs control such that categories in the data folder (complete data display, user folder, movie folder, photo folder, and coupon folder) are displayed (FIG. 7 (*c*)). Moreover, in a case in which the "photo folder" is selected from the data folder categories by a finger touch, the control unit 32 performs control such that contents in the photo folder are displayed as thumbnails (FIG. 7 (*d*)).

On the other hand, in a case in which an "attachment" item is touched by a pen on a screen for creating a new outgoing mail message (FIG. 7 (*a*)), the control unit 32 performs control such that a display menu for pen input is displayed on the display unit 21 (FIG. 7(*e*)). As shown in FIG. 7 (*e*), the display menu for pen input displays a list of all categories in the "data folder" (which may be configured such that some categories are displayed, and other categories may be displayed by using a scrolling feature) and all categories in the "external memory" (which may be configured such that some categories are displayed, and other categories may be displayed by using a scrolling feature), and displays buttons for allowing selection among a photo taking function and a movie taking function.

In a case in which the "photo folder" in the "data folder" is selected by a pen touch, the control unit 32 performs control such that contents in the photo folder are displayed as thumbnails (FIG. 7 (*d*)).

In this way, with the cellular telephone device 1, in a case of touching by a finger in the operation of selecting an attachment file when creating a mail message, the screen transitions through FIG. 7 (*a*), FIG. 7 (*b*), and FIG. 7 (*c*) to the screen for displaying thumbnails in the photo folder in FIG. 7 (*d*); and in a case of touching by a pen, the screen transitions through FIG. 7 (*a*) and FIG. 7 (*e*) to the screen for displaying thumbnails in the photo folder in FIG. 7 (*d*); therefore, a display screen adapted to the user's use case can be provided in accordance with whether a pen or a finger is used as the operational input means, and thus the operability can be improved.

It should be noted that the control unit 32 may be configured such that, in a state where the display menu for finger input as shown in FIG. 7 (*b*) is displayed on the display unit 21, in a case of recognizing that a predetermined location on the display menu is touched by a pen, the control unit 32 performs control such that the display menu for pen input as shown in FIG. 7 (*e*) is displayed on the display unit 21.

Ringtone Setting

Figure 8:
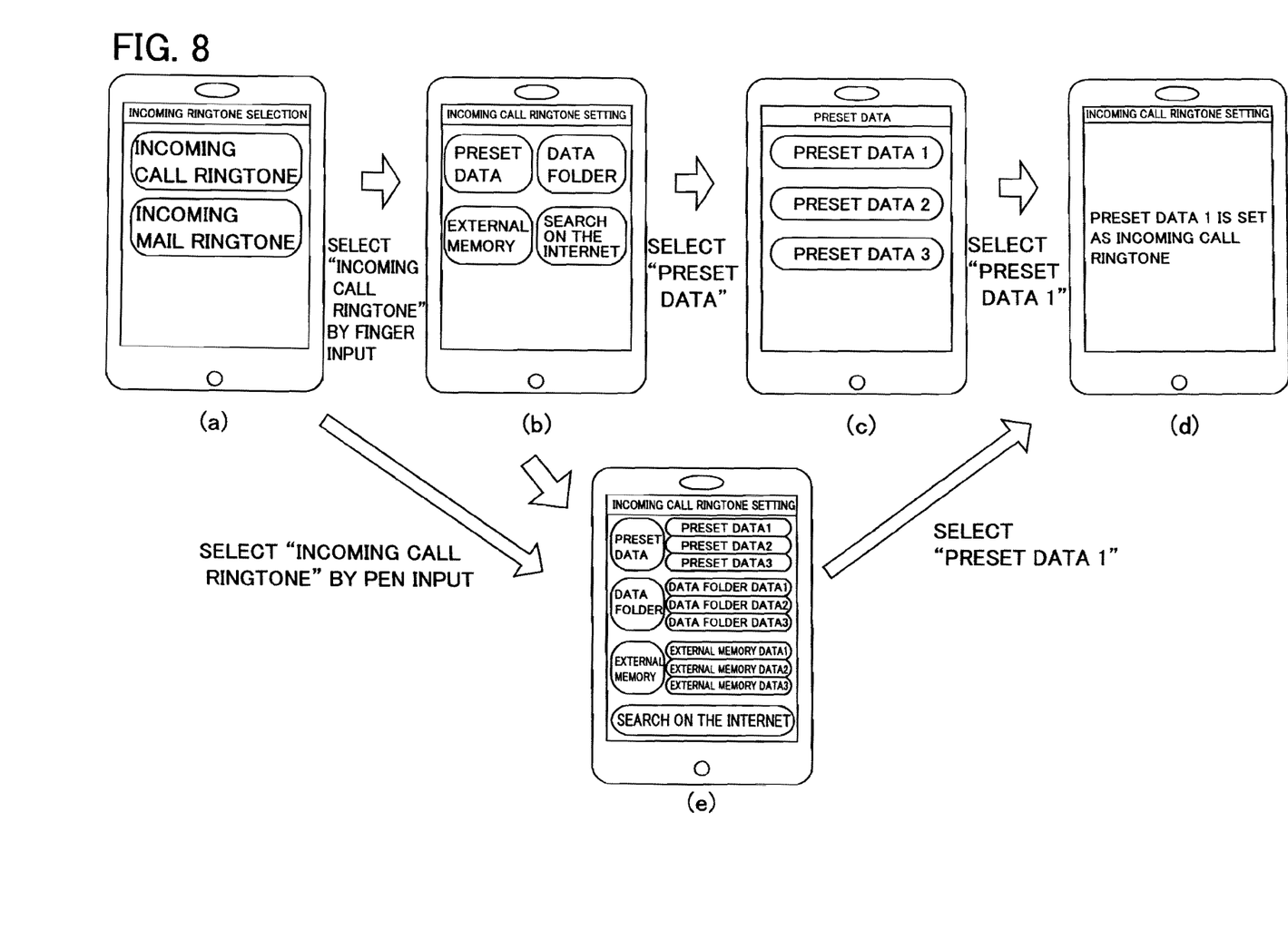
FIG. 8 is a schematic diagram showing how a display manner of the display unit changes depending on whether a touch input is made by a pen or a finger, when performing operations of setting ringtones.

Next, a detailed description is provided on how the display manner of the display unit 21 changes depending on whether a touch input is made by a pen or a finger, when performing the operation of setting ringtones. It should be noted that the following description assumes that the screen has transitioned to a screen for setting ringtones by a predetermined operation.

In a case in which an "incoming telephone ringtone" item is touched by a finger on a screen for setting ringtones (FIG. 8 (*a*)), the control unit 32 performs control such that a display menu for finger input is displayed on the display unit 21. The display menu for finger input is configured with a "preset data" item, a "data folder" item, an "external memory" item, and a "search on the Internet" item. It should be noted that, in a case in which the "search on the Internet" item is selected, a web browser is displayed, an internet connection is established, and a web page that can download setting tones is displayed.

In a case in which a "preset data" item is selected by a finger touch, the control unit 32 performs control such that preset data included in the "preset data" item is displayed as a list on the display unit 21 (FIG. 8 (*c*)). Moreover, in a case in which "preset data 1" is selected by a finger touch from the list of displaying the "preset data" items, the control unit 32 performs control to display predetermined display (for example, "preset data 1 is set as an incoming call ringtone") (FIG. 8 (*d*)).

On the other hand, in a case in which the "incoming call ringtone" item is touched by a pen on a screen for setting ringtones (FIG. 8 (*a*)), the control unit 32 performs control such that a display menu for pen input is displayed on the display unit 21 (FIG. 8 (*e*)). As shown in FIG. 8 (*e*), the display menu for pen input is configured with: complete preset data included in the "preset data" item (which may be configured such that only some preset data is displayed, and other preset data may be displayed by using a scrolling feature); complete data included in the "data folder" item (which may be configured such that only some data is displayed, and other data may be displayed by using a scrolling feature); complete external memory data included in the "external memory" item (which may be configured such that only some external memory data is displayed, and other external memory data may be displayed by using a scrolling feature); and the "search on the Internet" item.

In a case in which "preset data 1" is selected by a pen touch from the "preset data" items, the control unit 32 performs control to display predetermined display (for example, "preset data 1 is set as an incoming call ringtone") (FIG. 8 (*d*)).

In this way, with the cellular telephone device 1, in a case of touching by a finger in the operation of setting ringtones, the screen transitions through FIG. 8 (*a*), FIG. 8 (*b*), and FIG. 8 (*c*) to the predetermined display in FIG. 8 (*d*); and in a case of touching by a pen, the screen transitions through FIG. 8 (*a*) and FIG. 8 (*e*) to the predetermined display in FIG. 8 (*d*); therefore, a display screen adapted to the user's use case can be provided depending on whether a pen or a finger is used as the operational input means, and thus the operability can be improved.

It should be noted that the control unit 32 may be configured such that, in a state where the display menu for finger input as shown in FIG. 8 (*b*) is displayed on the display unit 21, in a case of recognizing that a predetermined location on the display menu is touched by a pen, the control unit 32 performs control such that the display menu for pen input as shown in FIG. 8 (*e*) is displayed on the display unit 21.

Alternative Embodiment

In addition, the cellular telephone device 1 may be configured to include: the display unit 21 that displays hierarchical items, and has the display area 33 capable of detecting a touch; the detecting unit 31 that detects a touch on the display area 33 of the display unit 21; and the control unit 32 that changes the number of a plurality of low-order hierarchical items associated with the high-order hierarchical item displayed on the display unit 21 in accordance with the touch state on the display area 33, when the detecting unit 31 detects a touch on the display area 33 corresponding to the high-order hierarchical item in a state where a plurality of high-order hierarchical items are displayed on the display unit 21. In this case, for example, the selection items in the first embodiment correspond to the high-order hierarchical items in the alternative embodiment, and the first hierarchical items in the first embodiment correspond to the low-order hierarchical items in the alternative embodiment. As another example, the first hierarchical items in the first embodiment correspond to the high-order hierarchical items in the alternative embodiment, and the second hierarchical items in the first embodiment correspond to the low-order hierarchical items in the alternative embodiment.

Furthermore, in the cellular telephone device 1, the control unit 32 may be configured to increase the displayed items of the plurality of first hierarchical items associated with the selection item displayed on the display unit 21, in accordance with a detection result of the detecting unit 31 that detects a touch on the display area 33 corresponding to the selection item displayed on the display unit 21.

With such a configuration, with the cellular telephone device 1, in a case in which a plurality of first hierarchical items such as a number of files in the data folder cannot be displayed in a single screen with an ordinary display, when a touch having a small touch dimensions such as a pen is detected, each of the first hierarchical items is displayed in a reduced manner to increase the number of displayed items; therefore, the need for an operation such as scrolling is eliminated, and the operability can be improved.

Moreover, in the cellular telephone device 1, the control unit 32 may be configured to decrease the displayed items of the plurality of first hierarchical items associated with the selection item displayed on the display unit 21, in accordance with a detection result of the detecting unit 31 that detects a touch on the display area 33 corresponding to the selection item displayed on the display unit 21.

In addition, the cellular telephone device 1 may be configured such that the detecting unit 31 can detect a touch on the display area 33 of the selection item as well as a touch on a display area 33 different from the display area 33 of the selection item, and when the detecting unit 31 detects such touches on the display areas 33 of the selection item in a state where the selection item is displayed on the display unit 21, the control unit 32 causes the display state of the display unit 21 to transition to the first display state or the second display state, in accordance with the touch state of the display area 33 of the selection item as well as the touch state of the display area 33 different from the display area 33 of the selection item. In this case, when the display unit 21 (the display area 33 of the selection item) is touched by a finger, it is likely that a display area 33 different from the display area 33 of the selection item may also be touched by the finger. On the other hand, when the display unit 21 (the display area 33 of the selection item) is touched by a pen, it is unlikely that a display area 33 different from the display area 33 of the selection item will also be touched by the pen. Therefore, the control unit 32 causes the display manner of the display unit 21 to transition to the first display state or the second display state, in accordance with the touch state on a display area 33 different from the display area 33 of the selection item (for example, whether a touch is made by a finger or a pen).

It should be noted that, although the display manner of the display unit 21 is changed depending on whether an input is made by a finger or a pen in the present embodiment, it is not limited thereto, and a configuration may be employed such that the display manner is changed in accordance with, for example, the size of a finger touching.

Second Embodiment

The cellular telephone device 1 according to the present embodiment has a touch panel, and has a function to improve the operability by appropriately changing the contents displayed on the display unit 21 in accordance with the touch state on the touch panel (for example, a touch input by a pen or a finger).

Similarly to the case of the configuration of the cellular telephone device 1 according to the first embodiment shown in FIG. 2, the configuration of the cellular telephone device 1 for exhibiting the functions includes the display unit 21, the detecting unit 31, the display area 33 and the control unit 32. The display unit 21 displays an initial screen (a screen that is displayed in a state of waiting for a telephone call). The detecting unit 31 can detect a touch on the display area 33 of the initial screen. When the detecting unit 31 detects a touch on the display area 33 of the initial screen in a state where the initial screen is displayed on the display unit 21, in accordance with the touch state on the display area 33 of the initial screen, the control unit 32 causes the display state of the display unit 21 to transition to a state of displaying selection items, or a state of displaying the first display item group having the plurality of first hierarchical items associated with the selection item.

With such a configuration, the cellular telephone device 1 can appropriately change a display manner in accordance with the touch state on the display area 33, and thus can improve the operability.

Figure 9:
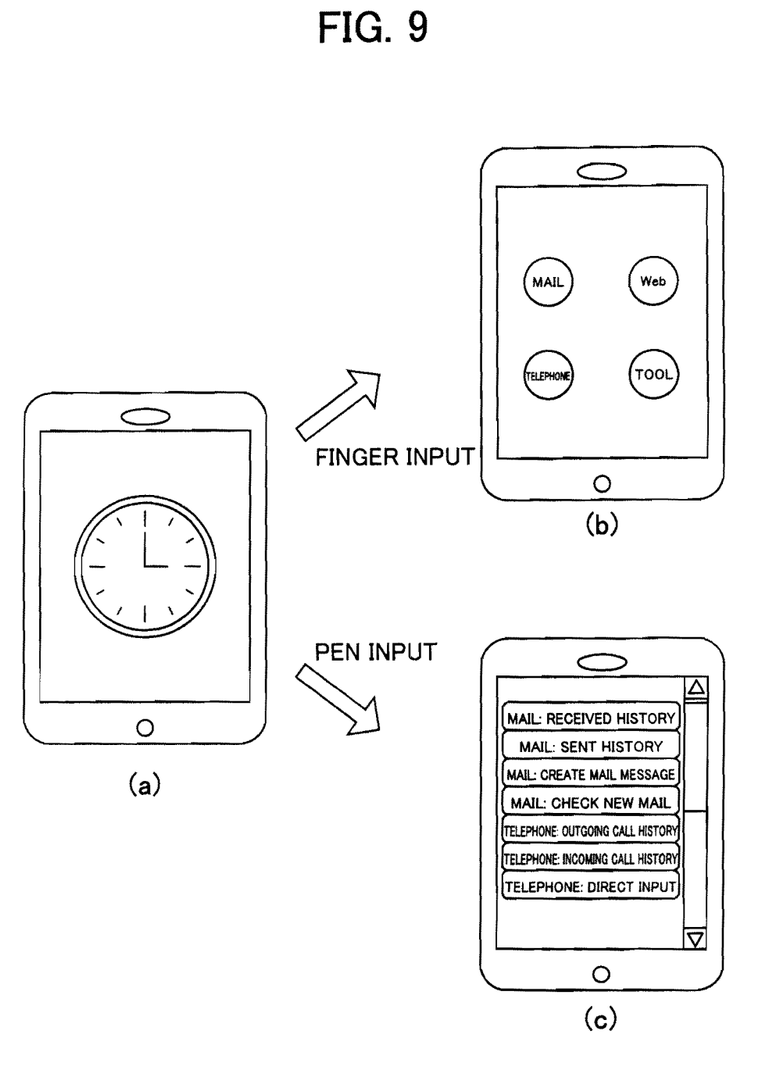
FIG. 9 is a schematic diagram showing how a display manner changes depending on whether a touch input is made by a pen or a finger, when displaying selection items on the display unit, or when displaying first hierarchical items on the display unit.

Next, a description is provided on how the display manner of the display unit 21 changes depending on whether a touch input is made by a pen or a finger, when displaying selection items on the display unit 21 or displaying the first display items associated with the first hierarchical item on the display unit 21.

In a state where the initial screen is displayed on the display unit 21 (FIG. 9 (*a*)), in a case in which the initial screen is touched by a finger, the control unit 32 performs control to display selection items on the display unit 21 (FIG. 9 (*b*)). On the other hand, in a state where the initial screen is displayed on the display unit 21 (FIG. 9 (*a*)), in a case in which the initial screen is touched by a pen, the control unit 32 performs control to display a display menu for pen input on the display unit 21 (FIG. 9 (*c*)).

In this way, with the cellular telephone device 1, in a state where the initial screen is displayed on the display unit 21, in a case in which the initial screen is touched by a finger, the screen transitions to the screen display as shown in FIG. 9 (d); and in a case in which the initial screen is touched by a pen, the screen transitions to the screen display as shown in FIG. 9 (c); therefore, a display screen adapted to the user's use case can be provided depending on whether a pen or a finger is used as the operational input means, and thus the operability can be improved.

Third Embodiment

The cellular telephone device 1 according to the present embodiment has a touch panel, and has a function to improve the operability by appropriately changing the contents displayed on the display unit 21 in accordance with the touch state on the touch panel (for example, a touch input by a pen or a finger).

Similarly to the case of the configuration of the cellular telephone device 1 according to the first embodiment shown in FIG. 2, the configuration of the cellular telephone device 1 for exhibiting the functions includes the display unit 21, the detecting unit 31, the display area 33 and the control unit 32. Selection items are displayed on the display unit 21. The detecting unit 31 can detect a touch on a display area 33 different from the display area 33 of the selection item. In a state where a selection item is displayed on the display unit 21, in a case in which the detecting unit 31 detects a touch on a display area 33 different from the display area 33 of the selection item, in accordance with the touch state on the display area 33 different from the display area 33 of the selection item, the control unit 32 causes the display state of the display unit 21 to transition to a state of maintaining the display of the selection item, or a state of displaying the first display item group having the plurality of first hierarchical items associated with the selection item.

With such a configuration, the cellular telephone device 1 can appropriately change a display manner in accordance with the touch state on the display area 33, and thus the operability can be improved.

Figure 10:
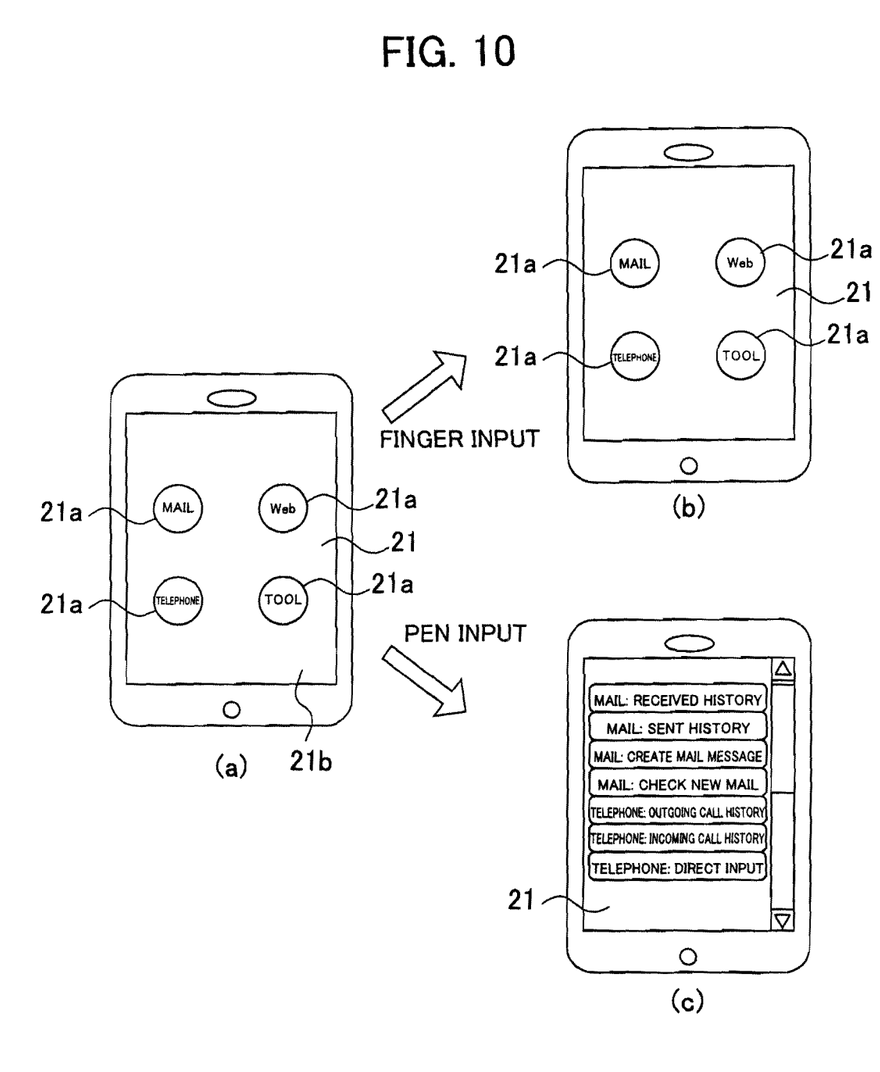
FIG. 10 is a schematic diagram showing how the display manner changes depending on whether a touch input is made by a pen or a finger, when causing the selection items to remain displayed on the display unit, or when displaying the first hierarchical items on the display unit.

Next, a description is provided on how the display manner changes depending on whether a touch input is made by a pen or a finger, when maintaining the display of the selection item on the display unit 21, or displaying the plurality of first display items associated with the selection item on the display unit 21.

In a state where selection items 21a are displayed on the display unit 21 (FIG. 10 (a)), in a case in which a display area 21b other than the selection items 21a (the display area 21b different from the display area 33 corresponding to the selection items 21a) is touched by a finger, the control unit 32 performs control such that the selection items 21a remain displayed on the display unit 21 (FIG. 10 (b)). On the other hand, in a state where the selection items 21a are displayed on the display unit 21 (FIG. 10 (a)), in a case in which the display area 21b other than the selection items 21a is touched by a pen, the control unit 32 performs control to display a display menu for pen input on the display unit 21 (FIG. 10 (c)).

In this way, with the cellular telephone device 1, in a state where the selection items 21a are displayed on the display unit 21, in a case in which the display area 21b other than the selection items 21a (the display area 21b different from the display area 33 corresponding to the selection items 21a) is touched by a finger, the screen transitions to the screen display as shown in FIG. 10 (b); and in a case in which the display area 21b is touched by a pen, the screen transitions to the screen display as shown in FIG. 10 (c); therefore, a display screen adapted to the user's use case can be provided depending on whether a pen or a finger is used as the operational input means, and thus the operability can be improved.

It should be noted that the present embodiment is described for a case in which the entire display menu for pen input is displayed on the display unit 21, when the display area 21b different from the display area 33 corresponding to the selection items 21a is touched by a pen. However, as an alternative embodiment, in a case in which the display area 21b different from the display area 33 corresponding to the selection items is touched by a pen, the control unit 32 may perform control to display a selection item close to a position touched by the pen and/or a plurality of first hierarchical items associated with the selection item close to the position touched by the pen.

EXPLANATION OF REFERENCE NUMERALS 1 cellular telephone device
21 display unit
31 detecting unit
32 control unit
33 display area

The invention claimed is:

1. An electronic device comprising:
a display unit that displays a selection item;
a detecting unit that detects a touch to the selection item; and
a control unit, wherein, upon detecting a touch to the selection item, the control unit performs transition to a different display screen in accordance with touch dimensions on the selection item,
wherein, if the touch dimensions on the selection item are greater than a predetermined value, the control unit performs transition to a first display screen displayed including a plurality of first hierarchical items being low-order items of the selection item, to which the touch is detected
wherein, if the touch dimensions on the same selection item are smaller than the predetermined value, the control unit performs transition to a second display screen including the first hierarchical items and second hierarchical items, the second hierarchical items being low-order items of the first hierarchical items, and
wherein, in the second display screen, among the plurality of first hierarchical items, the first hierarchical items without low-order items are displayed larger than the first hierarchical items with low-order items.

2. The electronic device according to claim 1,
wherein, if the touch dimensions on the selection item are greater than a certain level, the control unit performs transition to the first display screen, and
wherein, if the touch dimensions on the same selection item are not greater than the certain level, the control unit performs transition to the second display screen.

3. The electronic device according to claim 1,
wherein the detecting unit can detect a touch to an initial screen,
wherein, in a state where the initial screen is displayed on the display unit, upon detecting a touch to the initial screen, if the touch dimensions on the initial screen are greater than a predetermined value, the control unit performs transition to a screen displaying the selection item, or if the touch dimensions on the initial screen are smaller than the predetermined value, the control unit performs transition to a screen displaying including the plurality of first hierarchical items being low-order items of the selection item.

4. The electronic device according to claim 1, wherein the control unit performs transition of a display state of the display unit in accordance with the touch dimensions.

5. The electronic device according to claim 4, wherein the detecting unit includes a plurality of capacitive sensors, and detects a touch to the selection item by way of change in electrostatic capacity in the capacitive sensors, and wherein the control unit determines the touch dimensions in accordance with a number of the capacitive sensors for which electrostatic capacity has changed.

6. The electronic device according to claim 1, wherein the detecting unit can detect a touch to a display area different from a display area of the selection item, and wherein, in a case in which the detecting unit detects a touch to an area including the display area of the selection item, the control unit performs transition to the first display screen or the second display screen, in accordance with a state of touch to the display area of the selection item as well as a state of touch to the display area different from the display area of the selection item.

7. The electronic device according to claim 1, wherein the detecting unit can detect a touch to a display area different from the display area of the selection item, and wherein, in a state where the selection item is displayed on the display unit, upon detecting a touch to the display area different from the display area of the selection item, in accordance with a state of touch to the display area different from the display area of the selection item, the control unit maintains the displaying of the selection item, or performs transition to a screen including the currently displayed selection item and the first hierarchical items.

8. The electronic device according to claim 1, further comprising:

a body; and a removable member that can be attached to and detached from the body, the detecting unit being capable of detecting a touch to a display area of the display unit, wherein, upon detecting a touch to the display area of the selection item, transition is performed to the first display screen or the second display screen, in accordance with the state of touch that is determined based on an attachment/detachment state of the removable member in relation to the body.

9. The electronic device according to claim 1, wherein, once the control unit obtains touch dimensions on the selection item, the control unit thereafter determines that subsequent touches will have the obtained touch dimensions, even if the selection item is touched.

10. A display method in an electronic device, the method comprising:

a first step of displaying a selection item on a display unit;

a second step of detecting a touch the selection item; and a third step of performing transition to a different display screen, in accordance with touch dimensions on the selection item, wherein, in the third step, if the touch dimensions on the selection item are greater than a predetermined value, transition is performed to a first display screen displayed including a plurality of first hierarchical items being low-order items of the selection item, to which the touch is detected, or if the touch dimensions on the same selection item are smaller than the predetermined value, transition is performed to a second display screen including the first hierarchical items and second hierarchical items being low-order items of the first hierarchical items, and wherein, in the second display screen, among the plurality of first hierarchical items, the first hierarchical items without low-order items are displayed larger than the first hierarchical items with low-order items.

\* \* \* \* \*